(12) United States Patent
Gupta et al.

(10) Patent No.: US 10,469,309 B1
(45) Date of Patent: Nov. 5, 2019

(54) MANAGEMENT OF COMPUTING SYSTEM ALERTS

(71) Applicant: ServiceNow, Inc., Santa Clara, CA (US)

(72) Inventors: Sachin Gupta, Bellevue, WA (US); Scott Tucker, Kirkland, WA (US); James Crotinger, Kirkland, WA (US); Kanwaldeep Kaur Dang, Sammamish, WA (US); Eugen Ardeleanu, Bellevue, WA (US); Purushottam Amradkar, Sammamish, WA (US); Chinna Babu Polinati, Snoqualmie, WA (US)

(73) Assignee: ServiceNow, Inc., Santa Clara, CA (US)

( * ) Notice: Subject to any disclaimer, the term of this patent is extended or adjusted under 35 U.S.C. 154(b) by 124 days.

(21) Appl. No.: 15/141,395

(22) Filed: Apr. 28, 2016

(51) Int. Cl.
*H04L 12/24* (2006.01)
*H04L 29/08* (2006.01)
*H04L 29/06* (2006.01)

(52) U.S. Cl.
CPC ............ *H04L 41/065* (2013.01); *H04L 41/22* (2013.01); *H04L 67/10* (2013.01); *H04L 67/42* (2013.01)

(58) Field of Classification Search
CPC ....... H04L 41/065; H04L 41/22; H04L 67/10; H04L 67/42
USPC ......................................................... 709/223
See application file for complete search history.

(56) References Cited

U.S. PATENT DOCUMENTS

| | | | |
|---|---|---|---|
| 7,301,448 B1 | 11/2007 | Usery et al. | |
| 2002/0008697 A1* | 1/2002 | Deering | G06T 5/006 345/418 |
| 2003/0233130 A1* | 12/2003 | Padmanabhan | A61N 1/3622 607/9 |
| 2008/0091466 A1* | 4/2008 | Butler | G06F 19/327 705/2 |
| 2011/0165145 A1* | 7/2011 | Dransfield | A61K 39/3955 424/130.1 |
| 2014/0006871 A1* | 1/2014 | Lakshmanan | H04L 41/065 714/37 |

(Continued)

OTHER PUBLICATIONS

Valeur et al.; "A Comprehensive Approach to Intrusion Detection Alert Correlation"; IEEE Transactions on Dependable and Secure Computing; vol. 1, No. 3, Jul.-Sep. 2004; 26 pages.

(Continued)

*Primary Examiner* — Joseph L Greene
(74) *Attorney, Agent, or Firm* — Fletcher Yoder PC

(57) ABSTRACT

An apparatus for grouping alerts generated by automated monitoring of at least an operating condition of a machine, represented as a configuration item in a configuration management database, in a computer network. A first event pattern is identified based on configuration items associated with an alert avalanche identified from received historical alert data stored in memory. A second event pattern is identified based on co-occurrences of configuration item pairs in the historical alert data and on at least one conditional probability parameter. At least one alert group is determined by comparing at least one configuration item associated with a current alert to the plurality of configuration items of the first event pattern and of the second event pattern stored in memory. A graphical display region for displaying the alert group is generated.

21 Claims, 11 Drawing Sheets

(56) References Cited

U.S. PATENT DOCUMENTS

| | | | |
|---|---|---|---|
| 2014/0025998 A1* | 1/2014 | Schimmelpfeng | G06F 11/079 714/39 |
| 2015/0199112 A1* | 7/2015 | Van Ryswyk | G06F 3/0481 715/762 |
| 2015/0267591 A1* | 9/2015 | Miller | F01N 11/002 60/273 |
| 2016/0004580 A1* | 1/2016 | Momot | H04L 63/1416 714/47.3 |

OTHER PUBLICATIONS

Julisch et al.; Mining Alarm Clusters to Improve Alarm Handling Efficiency; ACSAC '01. Proceedings of the 17th Annual Computer Security Applications Conference; IEEE Computer Society Washington, DC, USA; 2001; 10 pages.

* cited by examiner

| | DATA STORAGE 402 | | | |
|---|---|---|---|---|
| | ALERT TABLE 404 | | | |
| | ALERT ID (412) | TIME STAMP (414) | CI ID (416) | METRIC (418) |
| 521 → | A_001 | 2015-14-04 1015:36 | CI-26 | HI MEM UTILIZ. |
| | A_002 | 2015-14-04 1015:38 | CI-26 | HI CPU UTILIZ. |
| 522 → | A_003 | 2015-14-04 1016:02 | CI-27 | HI CPU UTILIZ. |
| | A_004 | 2015-14-04 1016:11 | CI-43 | HI CPU UTILIZ. |
| | ⋮ | ⋮ | ⋮ | ⋮ |
| 523 → | A_389 | 2015-14-09 1615:21 | CI-26 | HI MEM UTILIZ. |
| 524 → | A_390 | 2015-14-09 1616:18 | CI-27 | HI CPU UTILIZ. |
| | A_391 | 2015-14-09 1616:21 | CI-36 | HI CPU UTILIZ. |
| | A_392 | 2015-14-09 1616:22 | CI-58 | HI CPU UTILIZ. |
| | ⋮ | ⋮ | ⋮ | ⋮ |
| 525 → | A_689 | 2015-14-09 1615:21 | CI-43 | HI MEM UTILIZ. |

*FIG. 4*

MANAGEMENT OF COMPUTING SYSTEM ALERTS

TECHNICAL FIELD

The present disclosure relates to systems and methods for processing alerts indicative of conditions of a computing system. More generally, the present disclosure relates to a data processing system for error or fault handling, namely, by aggregating data used for and generated in response to performing impact calculation on resources of a computing system. Implementations of the present disclosure can be used to enhance the ability of a server programmed for organizing and manipulating data for responding to planned or unplanned conditions identified with respect to hardware or software resources included within the computing system.

BACKGROUND

A computing system, such as a cloud computing system, providing software based services to a customer, uses a network of one or more servers configured to execute various programs for delivering services to client computing devices. A system operator may receive hundreds of alerts daily, such as notifications that a hardware or software component in the cloud computing system requires a change or modification. To address the alerts in a timely and efficient manner, alerts can be triaged for dispositioning. Appropriate assignments need to be identified for dispositioning each alert, with consideration to both technical and security qualifications. Monitoring tools allow detection of health and status of network resources, and enable a variety of network maintenance functions.

SUMMARY

One implementation of the disclosure is an apparatus for grouping alerts generated by automated monitoring of an operating condition of a machine in a computing system, the machine represented as a configuration item in a configuration management database, the apparatus comprising a processor configured to execute instructions stored in a memory, the instructions including an avalanche pattern detection module, a conditional probability pattern detection module, an alert grouping module, and a presentation module. The avalanche pattern detection module may receive historical alert data, and identify a first event pattern of alert information based on at least one avalanche of alerts identified from the historical alert data. The historical alert data includes a time stamp, a configuration item identifier, and an alert metric associated with each alert stored in the memory prior to the alert history time marker. The first event pattern of alert information is stored in the memory. The conditional probability pattern detection module may receive the historical alert data and at least one conditional probability parameter, and identify a second event pattern of alert information based on co-occurrences of configuration item pairs in the historical alert data and on the at least one conditional probability parameter. The second event pattern is stored in the memory. The alert grouping module may determine at least one alert group by comparing at least one configuration item associated with a current alert to the plurality of configuration items of the first event pattern and of the second event pattern stored in the memory. The presentation module may generate a graphical display region for displaying the at least one alert group.

Another implementation of the disclosure is an apparatus for grouping alerts generated by automated monitoring of at least an operating condition of a machine in a computing system, the machine represented as a configuration item in a configuration management database, the apparatus comprising a processor configured to execute instructions stored in a memory, the instructions including a pattern detection module, an alert grouping module, and a presentation module. The pattern detection module may identify an event pattern from historical alert data associated with a plurality of configuration items. The event pattern is based on an intersection of configuration items identified in an avalanche of alerts with configuration items identified in the historical alerts. The pattern detection module may identify the avalanche of alerts based on at least one avalanche parameter, and store the event pattern in the memory. The alert grouping module may determine at least one alert group by comparing at least one configuration item associated with a current alert to the plurality of configuration items of the pattern stored in the memory. The presentation module may generate a graphical display region for displaying the alert group.

BRIEF DESCRIPTION OF THE DRAWINGS

The description herein makes reference to the accompanying drawings wherein like reference numerals refer to like parts throughout the several views.

FIG. 4 is a block diagram of an example alert table in accordance with the present disclosure.

DETAILED DESCRIPTION

A distributed computing system, such as a cloud computing system, may include multiple computing devices at a customer end and multiple computer servers at a service provider end, which may be interconnected by a cloud network. As customer devices request services and use resources provided by the server devices, the flow of information must be controlled and monitored to maintain quality of service. At times of higher demand for services and resources, nodes, such as servers, along the interconnected network may encounter overload conditions and traffic may need to be rerouted to other available nodes that are currently not overloaded. Alerts may be triggered upon detection of conditions or events that relate to nodes being overloaded. Other examples of alerts that may be triggered may include when a customer or server device is down due to a hardware or software error or failure.

When a significant condition or event occurs that affects multiple devices in the cloud computing system, a cluster or "avalanche" of alerts may be triggered within a short time period. Over time, as avalanches of alerts are detected, patterns of affected nodes may emerge, which can be stored and used as a template during real time monitoring of alerts. As a current alert is detected, it may be matched to learned patterns for aggregating the alert into one or more alert groups to more efficiently manage and dispatch the alert. Conditional probability patterns may also be developed based on stored alert information, which may further refine the learned patterns for the alert grouping. By aggregating alerts, system operators may more efficiently triage alerts for disposition.

Figure 1:
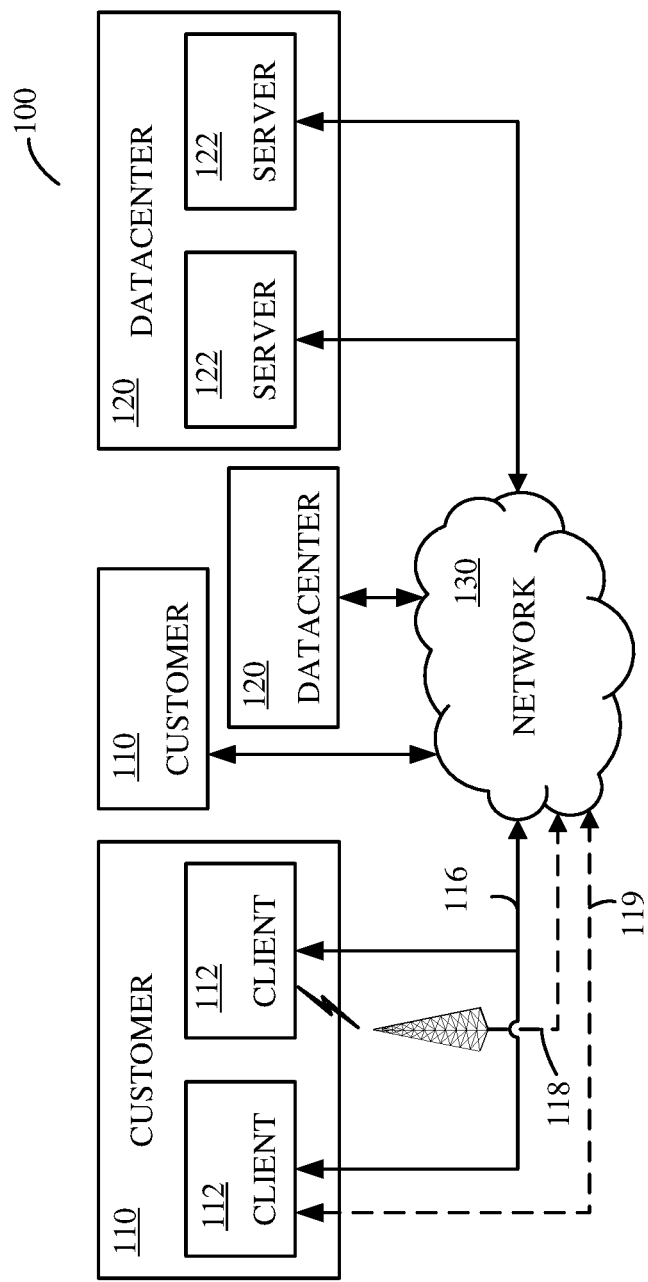
FIG. 1 is a block diagram of a computing network in which the teachings herein may be implemented.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system comprising multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g., a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
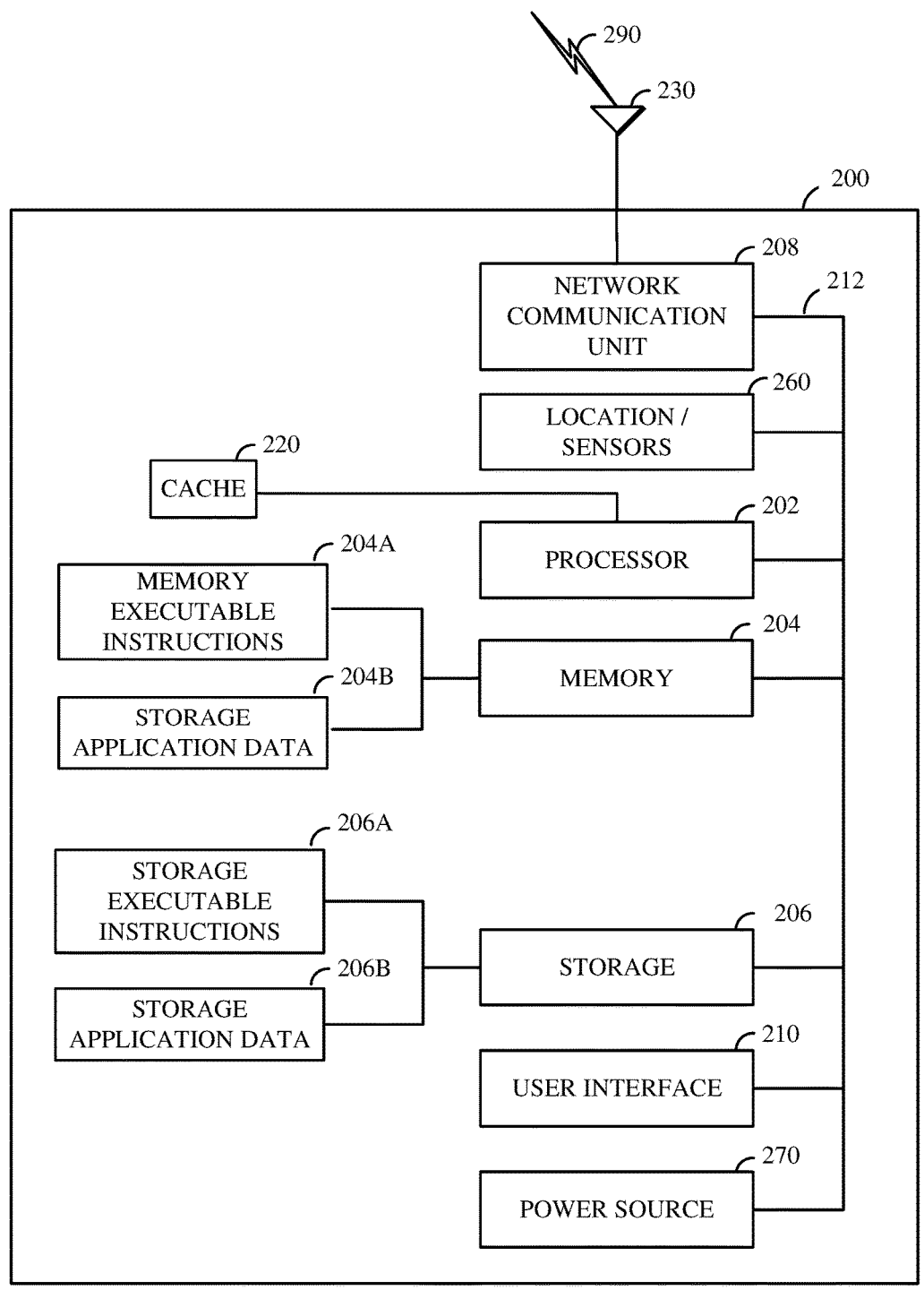
FIG. 2 is a block diagram of an example internal configuration of a computing device, such as a computing device of the computing network as shown in FIG. 1.

FIG. 2 is a block diagram of an example internal configuration of a computing device 200, such as a client 112 or server 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can comprise a number of components, as illustrated in FIG. 2. CPU (or processor) 202 can be a central processing unit, such as a microprocessor, and can include single or multiple processors, each having single or multiple processing cores. Alternatively, CPU/processor 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU/processor 202 can be distributed across multiple machines that can be coupled directly or across a local area or other network. The CPU/processor 202 can be a general purpose processor or a special purpose processor.

Memory 204, such as Random Access Memory (RAM), can be any suitable non-permanent storage device that is used as memory. RAM 204 can include executable instructions and data for immediate access by CPU/processor 202. RAM 204 typically includes one or more DRAM modules such as DDR SDRAM. Alternatively, RAM 204 can include another type of device, or multiple devices, capable of storing data for processing by CPU/processor 202 now-existing or hereafter developed. CPU/processor 202 can access and manipulate data in RAM 204 via bus 212. The CPU/processor 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can comprise executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU/processor 202. The executable instructions 206A may be organized into programmable modules or algorithms, functional programs, codes, and code segments designed to perform various functions described herein. The operating system can be, for example, Microsoft Windows®, Mac OS X®, or Linux®, or other operating system, or it can be an operating system for a small device, such as a smart phone or tablet device, or a large device, such as a mainframe computer. The application program can include, for example, a web browser, web server and/or database server. Application files/data 206B can, for example, include user files, database catalogs and configuration information. In an implementation, storage 206 comprises instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU/processor 202 via bus 212. The network communication unit 208 can utilized any of a variety of standardized network protocols, such as Ethernet, TCP/IP, to name a few of many protocols, to effect communications between devices. The interface 230 can include one or more transceiver(s) that utilize the Ethernet, power line communication (PLC), WiFi, infrared, GPRS/GSM, CDMA, etc.

A user interface can be broken down into the hardware user interface portion and the software user interface portion. A hardware user interface 210 can include a display, positional input device (such as a mouse, touchpad, touchscreen, or the like), keyboard, or other forms of user input and output devices and hardware. The hardware user interface 210 can be coupled to the CPU/processor 202 via the bus 212. Other output devices that permit a user to program or otherwise use the client or server can be provided in addition to or as an alternative to display. When the output device is or comprises a hardware display, this display can be implemented in various ways, including by a liquid crystal display (LCD) or a cathode-ray tube (CRT) or light emitting diode (LED) display, such as an OLED display.

The software graphical user interface constitutes programs and data that reflect information ultimately destined for display on a hardware device. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

Other implementations of the internal configuration or architecture of clients and servers 122 are also possible. For example, servers may omit the display. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. The computing device 200 may also contain a power source 270, such as a battery, so that the unit can operate in a self-contained manner. Computing device 200 may contain any number of sensors 260, such as detectors, that monitor physical conditions of the device 200 itself or the environment around the computing device 200. For example, sensors 260 may trigger alerts that provide indications of the physical conditions. Such alerts may indicate conditions that may include temperature of the CPU/processor 202, utilization of the CPU/processor 202 or RAM 204, utilization of the storage 206, and utilization of the power source 270. Such alerts of conditions detected by sensors 260 may safeguard against exceeding operational capacity or operational limits, such as hard drive rpm for storage 206, maximum temperature of CPU/processor 202 or power source 270, or any other physical health states of the computing device 200. Sensors 260 may include a location identification unit, such as a GPS or other type of location device. These may communicate with the CPU/processor 202 via the bus 212.

Figure 3:
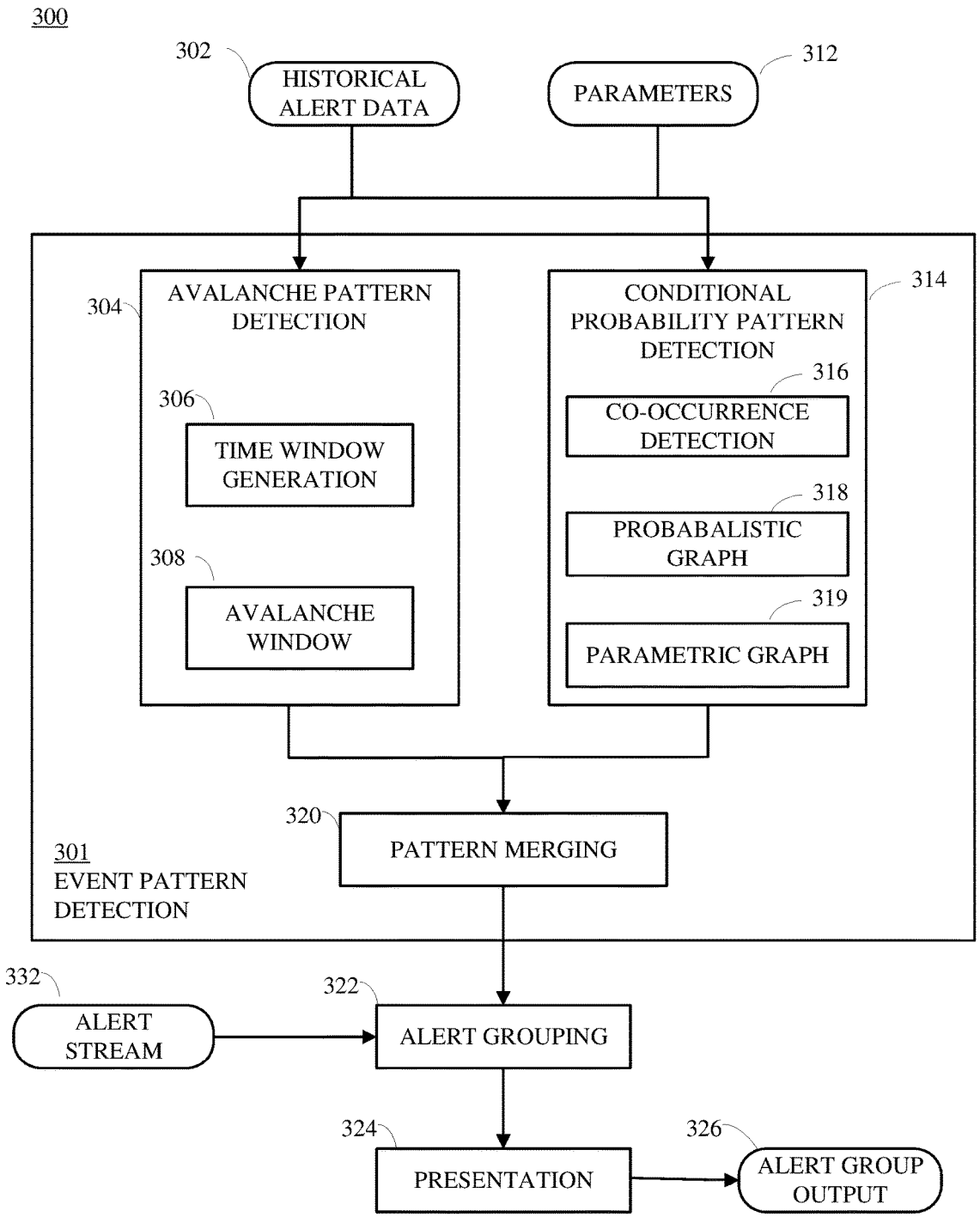
FIG. 3 is a block diagram of an example modular configuration of a computing device, such as the computing device as shown in FIG. 2, in accordance with the present disclosure.

FIG. 3 is a block diagram of an example modular configuration of a computing device, such as the computing device as shown in FIG. 2, in accordance with this disclosure. A modular configuration 300 may include an event pattern detection module 301, an alert grouping module 322, a presentation module 324, or any combination thereof. The event pattern detection module 301 may include an avalanche pattern detection module 304, a conditional probability pattern detection module 314, a pattern merging module 320, or a combination thereof.

The event pattern detection module 301 may receive inputs including historical alert data 302 and parameters 312. Historical alert data 302 may include information related to alerts prior to a selected time marker. For example, in the cloud computing system 100, an alert history period may be selected between a first time marker and a second time marker, which may be hours, days, weeks or months apart. The alert information for the historical alert data 302 may be stored as a table of alerts in one or more databases or data storage units, at one or more locations such as datacenter 120. Parameters 312 may include control values set by a user or system administrator for setting control limits or adjustments for various modules to execute functions related to pattern detection and alert grouping as described herein.

FIG. 4 is a block diagram of an example alert table in accordance with the present disclosure. The alert information for the historical alert data 302 may be stored as an alert table 404 as shown in FIG. 4, in a data storage unit 402. For each alert, the alert table 404 may include an alert ID 412, a time stamp 414, a configuration item (CI) ID 416, and an alert metric 418. For example, when an event triggers an alert, each alert may be recorded and stored in the data storage unit 402 with alert information including the time stamp 414 of when the alert was triggered, a CI ID 416 for the identity of the CI affected by the event, and the alert metric 418 that triggered the alert, which may include for example, high memory utilization or high CPU utilization. In some applications, an alert metric 418 for high memory utilization may be an indication that an additional server is needed to handle the current traffic or demand for services by clients 112 in the cloud computing system 100.

Returning to FIG. 3, an avalanche pattern detection module 304 may receive the historical alert data 302 and parameters 312 for processing to determine avalanche patterns. The avalanche pattern detection module 304 may include a time window generation module 306 and an avalanche window module 308. Parameters 312 used for avalanche detection may include values set by a user or system administrator to control the avalanche detection, including but not limited to, a factor value C1 used to determine a window size for counting alerts and a factor value C2 used to determine an avalanche threshold. In some applications, the time window generation module 306 may determine a fixed time window size based on inter-arrival times of consecutive alerts. The avalanche window module 308 may determine which time windows contain an avalanche of alerts based on a number of alerts observed in each time window compared to an avalanche threshold.

Figure 5:
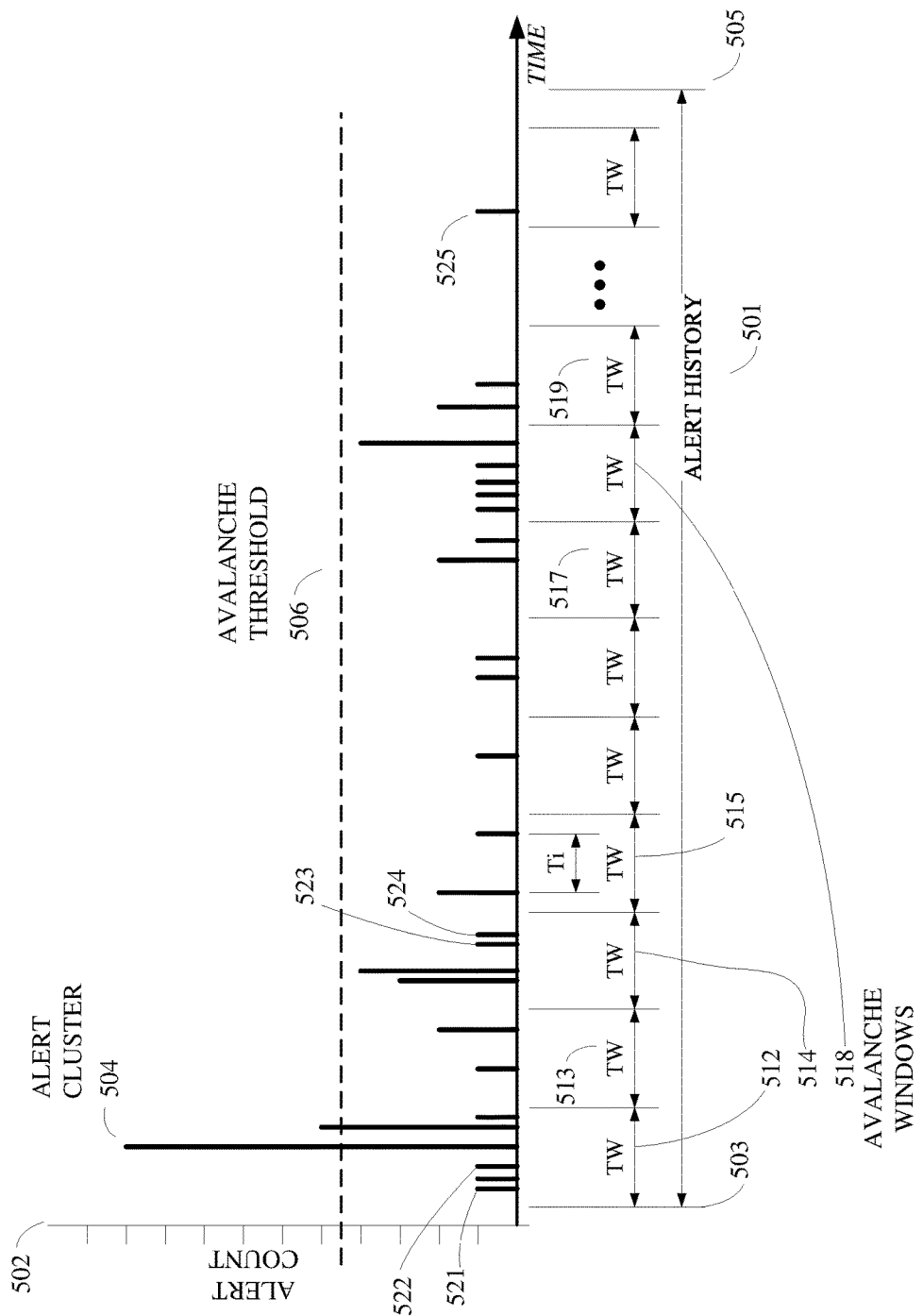
FIG. 5 is a diagram of an example time window size determination and avalanche window determination based on an alert history in accordance with the present disclosure.

FIG. 5 is a diagram of an example of time window size determination and avalanche window determination in accordance with the present disclosure. An alert history 501 may be defined between time markers 503, 505 where an alert 521 and an alert 525 may correspond with the first alert A_001 and last alert A_689, respectively, of an alert table such as alert table 404 shown in FIG. 4. An alert count 502 is shown for the alert history 501, including numerous alert clusters 504. An inter-arrival time Ti exists between alerts or alert clusters 504. The time window generation module 306 may divide the alert history into fixed time windows TW of the same size. The fixed time window size may be based on an average or a median of the inter-arrival times Ti for the alert history 501. For example, the time window size WS may be calculated according to the following equation.

$$WS = C1 * IAT \qquad \text{Equation (1)}$$

where
C1 is a constant value
IAT is a median of inter-arrival times Ti
The avalanche window module 308 may determine the avalanche windows 512/514/518 based on a total alert count 502 within each time window TW that meets or exceeds the avalanche threshold 506. For example, the avalanche threshold (AV_th) 506 may be calculated according to the following equation.

$$AV\_th = C2 * Acnt/TW \qquad \text{Equation (2)}$$

where
C2 is a constant value
Acnt/TW is a median of alert counts per time window
The avalanche pattern detection module 304 may merge time windows TW that are adjacent and consecutive to an avalanche window 512/514/518 so that any alerts in the adjacent windows may also be included for the avalanche pattern detection. For example, time windows 513 and 515 are adjacent to avalanche windows 512 and 514, and an expanded avalanche window is defined to include the alerts in the time windows 513 and 515 to form a merged avalanche of alerts, so that a more comprehensive set of alerts are considered for the avalanche pattern detection. Similarly, adjacent time windows 517 and 519 may be merged with avalanche window 518, and the alerts from the time windows 517/518/519 form a merged avalanche of alerts.

The avalanche pattern detection module 304 may compare each expanded avalanche window to each non-avalanche time window TW in the alert history 501 to locate intersections of alert information using parameters 312 that may include minimum frequency of intersections. Intersections of time windows may be identified by comparing the alert information between two time windows, and finding common alert information. For example, if an avalanche window has alerts of alert types A, B, C, D, E, F, and another window has alerts of alert types A, X, C, Z, E, G, then the intersection would be the set A, C, E. As an example, an alert type may be defined as a CI ID, alert metric combination. In a broader example, an alert type may be defined by the CI ID alone. In some applications, an intersection between an avalanche window and another window may produce the following set: [CI_30#CPU Utilization, CI_68#Memory, CI_72#CPU Utilization]. While alert type examples including CI ID and/or alert metric have been presented here, other mappings to different alert information types are possible.

In some applications, an intersection may be determined by matching a CI ID, such as CI-26 in expanded avalanche window 512/513/514/515 to another alert occurrence in another time window TW related to CI-26. Parameters 312 may include, for example, a parameter Fi for minimum frequency of intersections, which may be set to a value, such as Fi=3, by a user or system administrator. On a condition that three or more unique alert intersections, such as alerts for CI-26, are identified by the comparison at the avalanche pattern detection module 304, the intersections may be stored as a pattern. In some applications, where an intersection for alert types A, C, E exceed the minimum frequency parameter Fi, where A, C and E are each defined by a different CI ID and an alert metric combination, the intersection may be stored as a pattern.

The avalanche pattern detection module 304 may assign a score to each of the alert intersections based on the total number of alert intersections identified by the time window comparison for the entire alert history and based on the size of the expanded avalanche window. For example, an intersection score may be determined according to the following equation.

$$Int\_Score = Ni * (1 + Int\_size) \qquad \text{Equation (3)}$$

where
Int_Score is the score for the i'th intersection
Ni is frequency of i'th intersection
Int_size is number of CI, alert type in an intersection
Intersection scores may be defined by variations to the Equation (3) above.

Based on the intersection scores, avalanche patterns may be identified as follows. A list of intersections may be sorted in descending order according to intersection score. This sorted list of intersections may be sequentially processed one intersection at a time using an overlap test. As each intersection is considered, the aggregate set of event types for this avalanche list may be accumulated by taking the union of the event types in the current intersection with the event types in previous intersections that have been added to the pattern list. Given the set of alert types for the current intersection, if one or more of alert types in the current intersection which have already been seen in other intersections from this avalanche is a sufficiently small aggregate compared to a group overlap percentage threshold parameter, which may be one of input parameters 312, then that intersection is considered for addition to the pattern list. If the current intersection does not already exist in the pattern list, or is not contained in a pattern already in the pattern list, then this intersection may be added to the pattern list as a pattern. If the pattern list already contains a pattern that is a sub-set of the current intersection, then this intersection may replace that pattern in the list.

The following example illustrates identifying an avalanche pattern according to the above description. For an avalanche window containing event types A-G, the avalanche window may be compared with the other windows, generating the following list of intersections with their scores: (AG, 90), (ABC, 40), (CDG, 20), (DEF, 8). These intersections may be considered in the given order for addition to the pattern list. The first intersection AG passes the overlap test by default, leaving ["AG"] in the pattern list and A, G in the aggregate set of event types. Next, considering intersection ABC, its overlap with the aggregate set of event types A, G is 1 (i.e., "A"), which yields an aggregate percentage of 33.3% (i.e., A/ABC). If the group overlap percentage threshold is 40%, then the aggregate percentage is below the threshold, and the intersection may be added to the pattern list, which now contains ["AG", "ABC"] and the aggregate set of event types becomes A, B, C, G. Next, intersection CDG may be compared to the aggregate set of event types A, B, C, G, yielding an aggregate percentage of 66% (i.e., CD/CDG). Since this aggregate percentage is greater than the group overlap percentage threshold of 40%, intersection CDG is not added to the pattern list. Finally, intersection DEF is considered. Since DEF yields an overlap percentage of 0 compared to the aggregate set of event types, DEF may be added to the pattern list, which then becomes ["AG", "ABC", "DEF"], with an aggregate set of event types A, B, C, D, E, F, G. Note that if ABC had scored higher than AG, then AG would not be included in the pattern list. By developing avalanche patterns according to descending intersection scores for identified intersections of CI's and/or alert metrics, the avalanche pattern can be a useful tool for predicting specific health and status changes to the network resources, as will be described below in greater detail.

The avalanche pattern detection module 304 may validate patterns based on configuration management database (CMDB) information. For example, computing devices related to the candidate nodes may be interconnected in a cloud computing system, such as cloud computing system 100 shown in FIG. 1, and the interconnected dependencies may be tracked and updated in the CMDB. The CI's may also have dependency relationships based on instances of software modules, such as service applications for example, which reside on interconnected servers, such as servers 122 shown in FIG. 1. Using the CI dependency information from the CMDB, the avalanche pattern detection module 304 may compare the identified avalanche patterns to actual CI dependency information from the CMDB to determine if any patterns are invalid. For example, if one of the identified avalanche patterns consists of CI's that bear no interconnected relationship, then that pattern may be deleted from the avalanche patterns.

Returning to FIG. 3, the event pattern detection module 301 may include a conditional probability pattern detection module 314 for performing a pattern detection in parallel with the avalanche pattern module 304. The conditional probability pattern detection module 314 may include a co-occurrence detection module 316, a probabilistic graph module 318, and a parametric graph component module 319. The co-occurrence detection module 316 may determine a number of time windows TW of size WS according to Equation (2) above. Alternatively, the co-occurrence detection module 316 may receive the time window information and time window size WS from the avalanche pattern detection module 304. The co-occurrence detection module 316 may detect co-occurrences of CI pairs or groups in the time windows TW, which may or may not be avalanche windows. For example, as shown in FIGS. 4 and 5, alerts 521 and 522 occur within avalanche window 512 and relate to CI-26 and CI-27. The same pair of CI's, CI-26 and CI-27 appear in alerts 523 and 524 in avalanche window 514. In some applications, the co-occurrence detection module 316 may detect co-occurrences of CI ID, alert metric combination pairs or groups in the time windows TW.

Figure 6A:
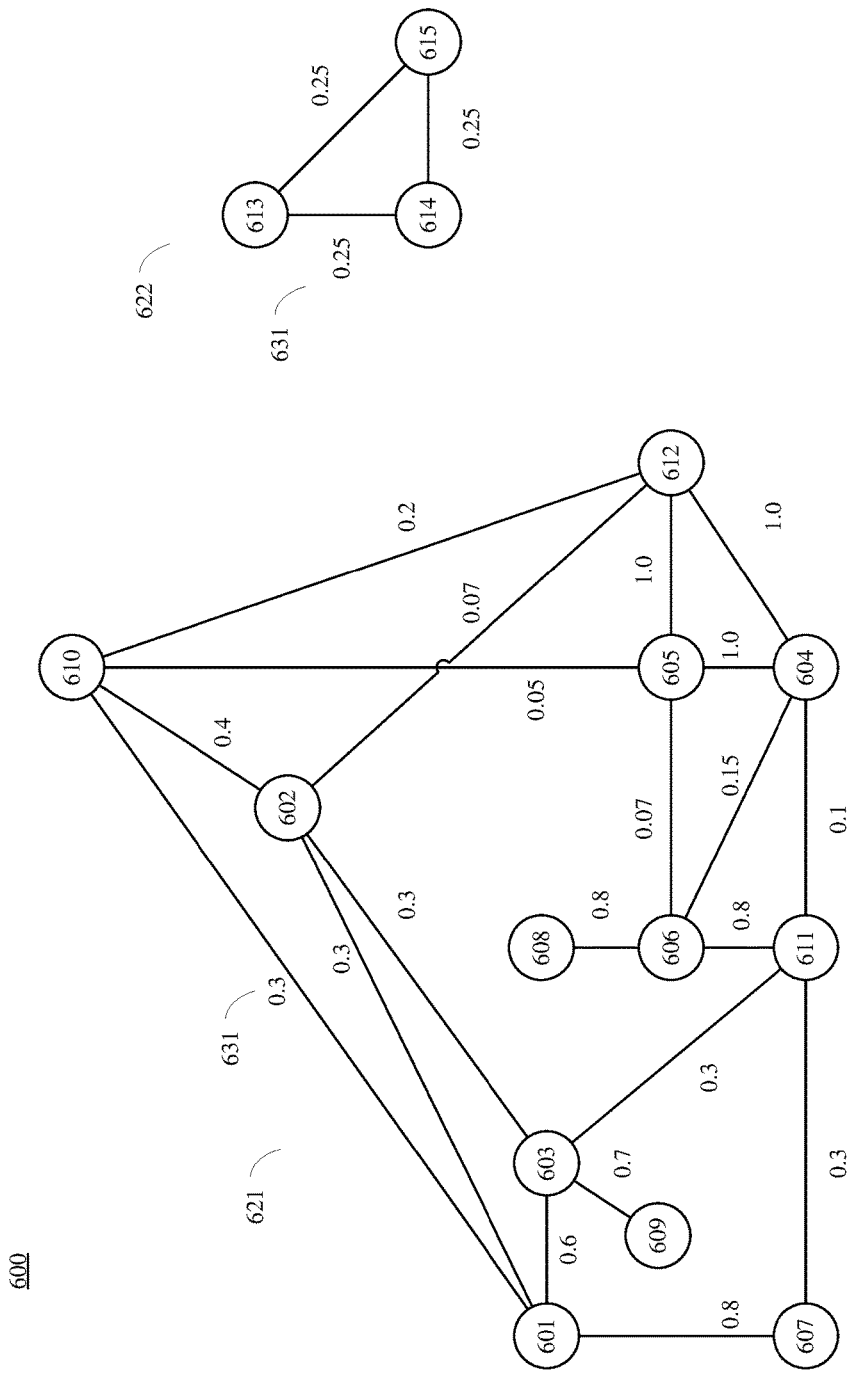
FIGS. 6A-6C are diagrams of an example conditional probabilistic graphing sequence in accordance with the present disclosure.
Figure 6B:
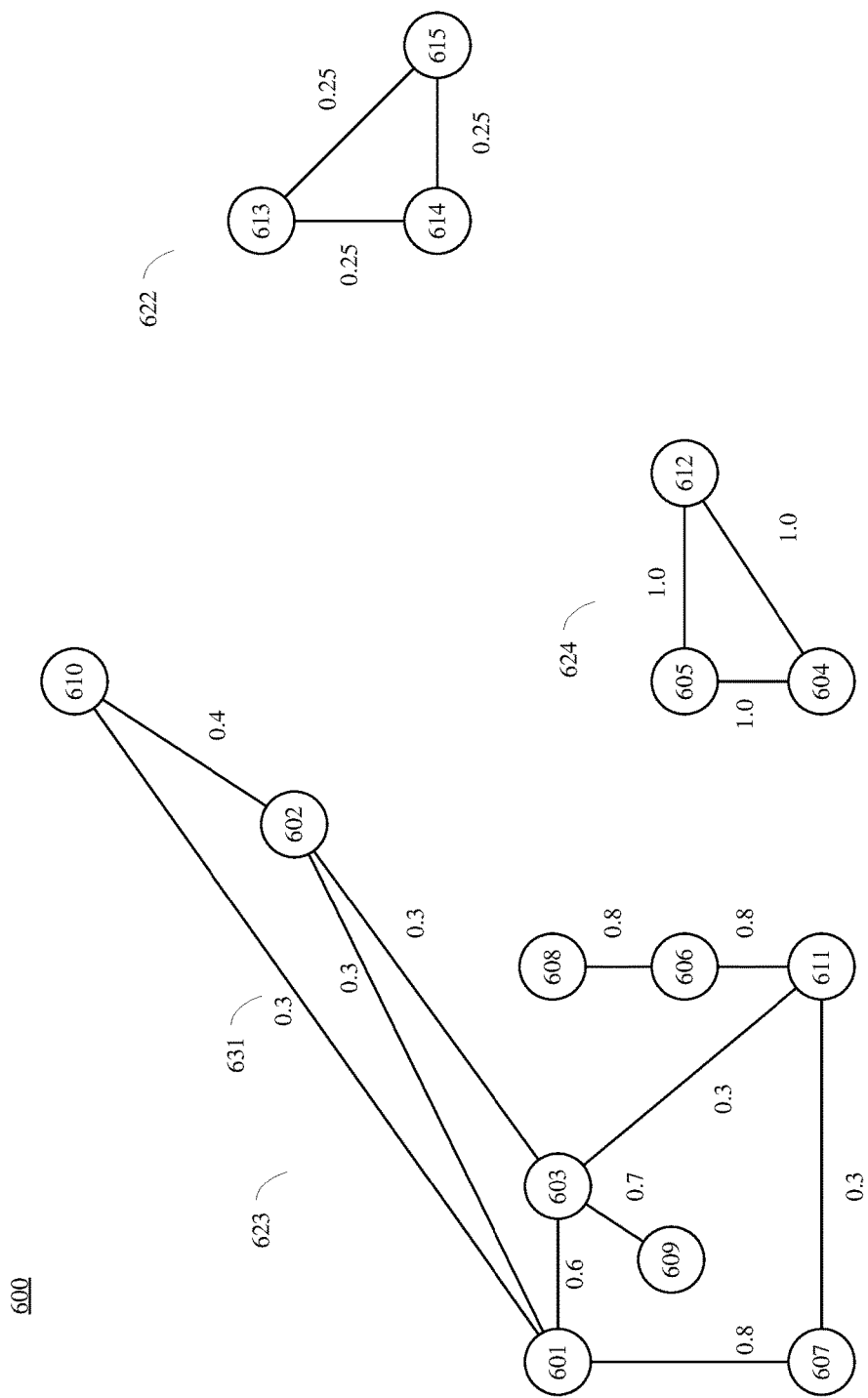
Figure 6C:
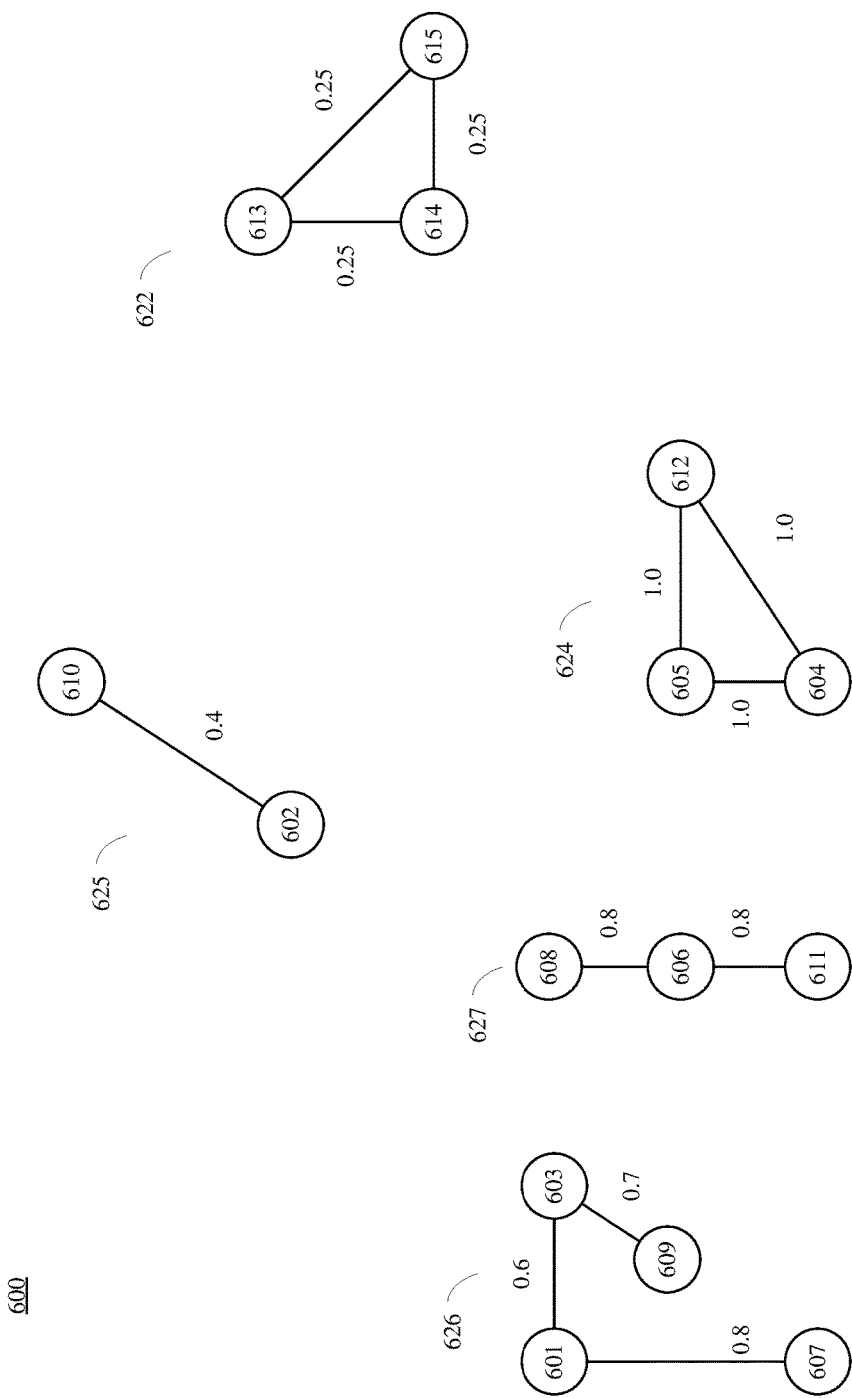

FIGS. 6A-6C are diagrams of an example conditional probabilistic graphing sequence in accordance with the present disclosure. The probabilistic graph module 318 may generate a conditional probabilistic graph, such as the probabilistic graph components 621 and 622 shown in FIG. 6A, based on parameters 312. For example, candidate nodes 601-612 of candidate graph component 621 may be identified based on parameters 312 set by a user or system administrator to include a minimum frequency of CI co-occurrences f_CI in the alert history 501.

The conditional probabilistic graph components 621 and 622 may be generated by probabilistic graph module 318 based on the results of the co-occurrence detection module 316, which may use pairwise probability. For example, each node on graph components 621, 622 may represent a CI or alert metric with a probability that meets or exceeds the f_CI parameter. A first count of how many co-occurrences of CI's and/or alert metrics occur in time window comparisons may be determined, and the first count may be compared to a second count of individual alerts to calculate a probability for each node. In some applications, a frequentist probability may be determined to establish the conditional probabilistic graph components 621, 622. In some applications, the probability may be calculated on a condition that the first count and the second count is not less than the f_CI parameter. For example, the probability of an alert A, such as at node 610 for a CI-26 alert may be determined given an alert B, such as at node 601 for a CI-27 alert, according to the following equation.

$$P(A|B)=N_{AB}/N_B \quad \text{Equation (4a)}$$

where

P(A|B) is probability of A given B

A is alert A

B is alert B $N_{AB}$ is number of time windows TW in which both alert A and B appear $N_B$ is number of time windows TW in which alert B appears Similarly, the probability of an alert B, given and alert A may be determined according to the following equation:

$$P(B|A)=N_{AB}/N_A \quad \text{Equation (4b)}$$

where $N_A$ is number of time windows TW in which alert A appears

In some applications, the probability P(A|B) may not be calculated if the number of A alerts or B alerts is less than the minimum frequency parameter value f_CI, and nodes for such low frequency alerts are omitted from the graph component.

The probabilistic graph components 621, 623 may be generated in some applications by the probabilistic graph module 318 based on parameters adjusted by parametric graph component module 319. For example, probabilistic graph components 621, 623 may be generated by defining the nodes according to the alert types A and B as nodes 601-615 and by adding edges 631 to the graph component if one of the pairwise conditional probabilities P(A|B) or P(B|A) exceeds an initial threshold CP_in, which may be one of parameters 312. For example, graph component 622 may be generated where alerts represented by nodes 613-615 have pairwise probability of 0.25 as shown by the edge value, which exceeds an initial threshold CP_in value of 0.04.

FIG. 6B shows an example of conditional probability graph components 621 and 622 after applying an adjusted threshold CP_in value in order to identify smaller subgraph components that represent stronger alert correlations. In this example, an edge count threshold EC may be established from the input parameters 312. In this example, the edge count parameter EC is set to EC=3 based on a determination that graph components having three edges provide optimum alert correlation. Since graph component 622 has three edges, only graph component 621 may be considered for reduction into subgraph components according to the following iterative process. A conditional probability threshold CP_in may be set to CP_in=0.2. Any edges having a value less than 0.2 are removed, which results in a two subgraph components 623 and 624 from the original graph component 621 shown in FIG. 6A. Since subgraph component 623 has an edge count exceeding edge count parameter EC=3, further reduction of the graph component is achieved as shown in FIG. 6C.

FIG. 6C shows an example of subgraph components 625-627 formed by eliminating edges of subgraph component 623 after raising the conditional probability threshold to 0.3 With the remaining graph components 622, 624-627 satisfying the edge count parameter EC=3, these graphs may be considered as having a critical size for conditional probability, and as such are potential patterns and may be stored by the conditional probability pattern detection module 314. While the above example applied iterations of conditional probability threshold increments of 0.1, other fixed-size or variable-size increments may be applied to accommodate different edge count EC thresholds and for more or less rapid approach to reach critical size graph components.

The conditional probability pattern detection module 314 may validate patterns based on an alert coverage parameter taken from parameters 312. For example, a percentage of alerts in alert history 501 that appear in a pattern from probabilistic graph components can be determined, and if the percentage is greater than the alert coverage parameter, the pattern is stored as a conditional probability pattern. If one or more patterns fail to meet the alert coverage parameter, the probabilistic graph components can be reformed based on adjustment to the parameters 312.

The conditional probability pattern detection module 314 may validate patterns based on CMDB information. For example, computing devices related to the candidate nodes may be interconnected in a cloud computing system, such as cloud computing system 100 shown in FIG. 1, and the interconnected dependencies may be tracked and updated in the CMDB. The CI's may also have dependency relationships based on instances of software modules, such as service applications for example, which reside on interconnected servers, such as servers 122 shown in FIG. 1. Using the CI dependency information from the CMDB, the probabilistic graph module 318 may compare the graph components, such as graph components 622, 624-627 shown in FIG. 6C, to actual CI dependency information from the CMDB to determine if any patterns are invalid. For example, if one of the graph components consists of CI's that bear no interconnected relationship, then a pattern based on that graph component may be deleted from the candidate patterns.

Returning to FIG. 3, a pattern merging module 320 may merge the patterns determined by the avalanche pattern module 304 with the patterns determined by the conditional probability pattern detection module 314. In some applications, the pattern merging module 320 may combine the avalanche patterns with the conditional probability patterns and store the union of patterns as learned patterns from the event pattern detection module 301. For example, the merged pattern information may be stored in alert tables with pattern IDs, each row consisting of a CI_ID, alert metric combination and pattern ID. In some applications, the merged pattern information may be stored as a hash map with key as pattern ID and value as set of entities representing the pattern.

An alert grouping module 322 may perform a matching function to compare an alert stream 332 to the stored patterns and assign an alert to an alert group if there is a match to one or more patterns. In some applications, the alert grouping module 322 may receive a current alert from alert stream 332 and compare the CI and/or the alert metric for the current alert to the learned patterns stored by the pattern merging module 320, and determine which one or more patterns include the same CI and/or alert metric.

An alert group may be formed by applying a sliding window. For example, a ten minute window may be defined according to parameters 312. The matching process starts with a first alert group AB, which may be kept active for maximum group lifetime, which may be an input parameter 312 based on a fixed time window, such as for example, a ten minute window. For example, the alert group AB may be compared to all alerts received from the alert stream 332 in the past ten minute window. The alert group AB may include a list of associated pattern IDs. If no match is made to pattern IDs associated with the alerts monitored in the alert stream, then the lifetime of alert group AB is expired, and no further comparisons are made to that alert group. If a pattern ID match is made for a current alert, such as an alert C, then alert group C is grouped with alert group AB, to form alert group ABC. For example, if alert C includes an alert type found within alert group AB, then alert C is added to the group. The list of pattern IDs for the group AB may be updated by keeping only those pattern IDs that contains C. The time is maintained for the updated list of pattern IDs whenever any new alert is grouped using that list. If a the time window elapses, the pattern IDs in that list has not been used to group alerts, the alert group may be finalized and no further comparison for future alerts is made.

In some applications, the alert group may include a set of alert types, such as a CI_ID, alert metric pairs, a list of patterns that match this set of alert types, a first alert time (i.e. the alert time for the earliest alert in the group) and a latest alert time (i.e., the alert time for the most recent alert added to the group). When processing a new set of alerts, all groups may be examined and if the current time minus the latest time for the group exceeds the time window, then the group is removed from the active list. If the current time minus the first alert time exceeds the maximum group lifetime parameter, then the group may be removed from the active list.

A presentation module 324 may generate a display region for displaying the alert groups for monitoring by a user or system administrator.

Figure 7:
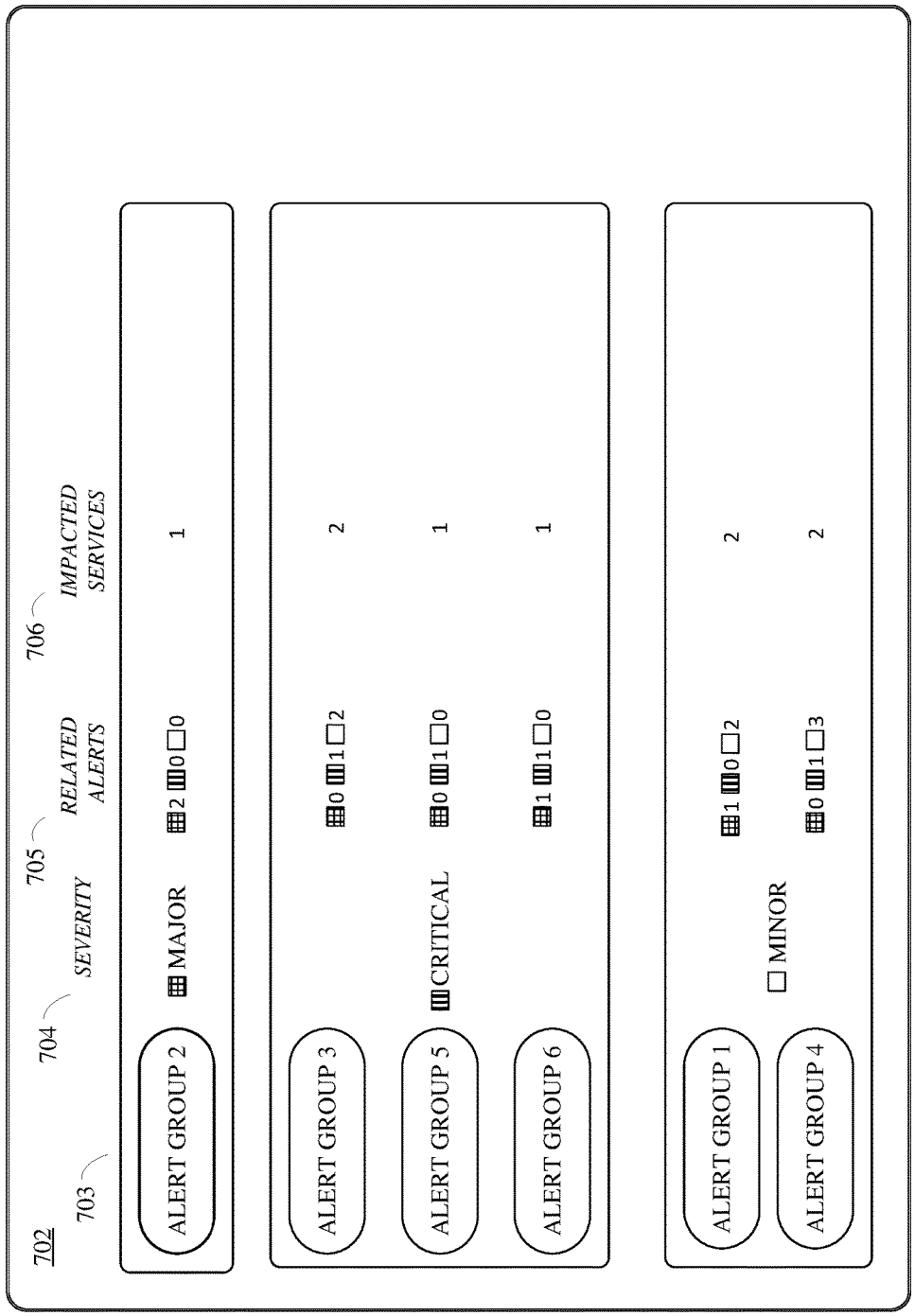
FIG. 7 is a diagram of an example display region generated for displaying alert groups in accordance with the present disclosure.

FIG. 7 is a diagram of an example display region generated for displaying alert groups in accordance with the present disclosure. The display region 702 may include a presentation of the alert groups 703, the severity type 704 of the alerts in the alert group, the severity of related alerts 705, and a count of impacted services 706. For example, an alert group 703, such as alert group 5, may have a critical severity type 704, and related alerts 705, such as 1 related alert having critical severity, 0 related alerts having major or minor severity, and 1 impacted service 706. Three severity types 704 are shown in FIG. 7 for illustrative purposes, however there may be more or less severity types. The alert groups 703 may be sorted by severity type 704 as shown in FIG. 7. Other presentations of the alert groups 703 may be presented by sorting according to other information shown in FIG. 7.

Alert groups determined by alert grouping module 322 may be evaluated based on a compression rate parameter and an alert coverage parameter from parameters 312. For example, the compression rate may be determined according to the following equation.

$$\text{Comp}=1-(N_{grp}+Rem)/N_{TOT} \quad \text{Equation (5)}$$

where

Ngrp is the number of alert groups

Rem is the number of remaining ungrouped alerts $N_{TOT}$ is the number of total alerts For example, a compression rate of 70% may be determined, meaning that the alert aggregation may reduce the number of raw alerts by 30%. Accordingly, the alert pattern detection and alert grouping is a useful tool to enable a user or system administrator to more efficiently manage alert dispositions by reducing the number of alerts, which may have been inflated due to redundancy of alerts. The compression rate may be compared to a compression parameter to determine if the number of alert groups are satisfactory.

The alert coverage may be determined according to the following equation.

$$Acov=N\_Agrpd/N_{TOT} \quad \text{Equation (6)}$$

where

N_Agrpd is the number of alerts assigned to a group $N_{TOT}$ is the number of total alerts For example, an alert coverage of 50% may be determined and compared to an alert coverage parameter to determine if the alert groups are satisfactory. If the alert coverage is insufficient, the alert groups may be modified, such as by adding new alert groups to capture more alerts that were omitted from the alert aggregation.

Figure 8:
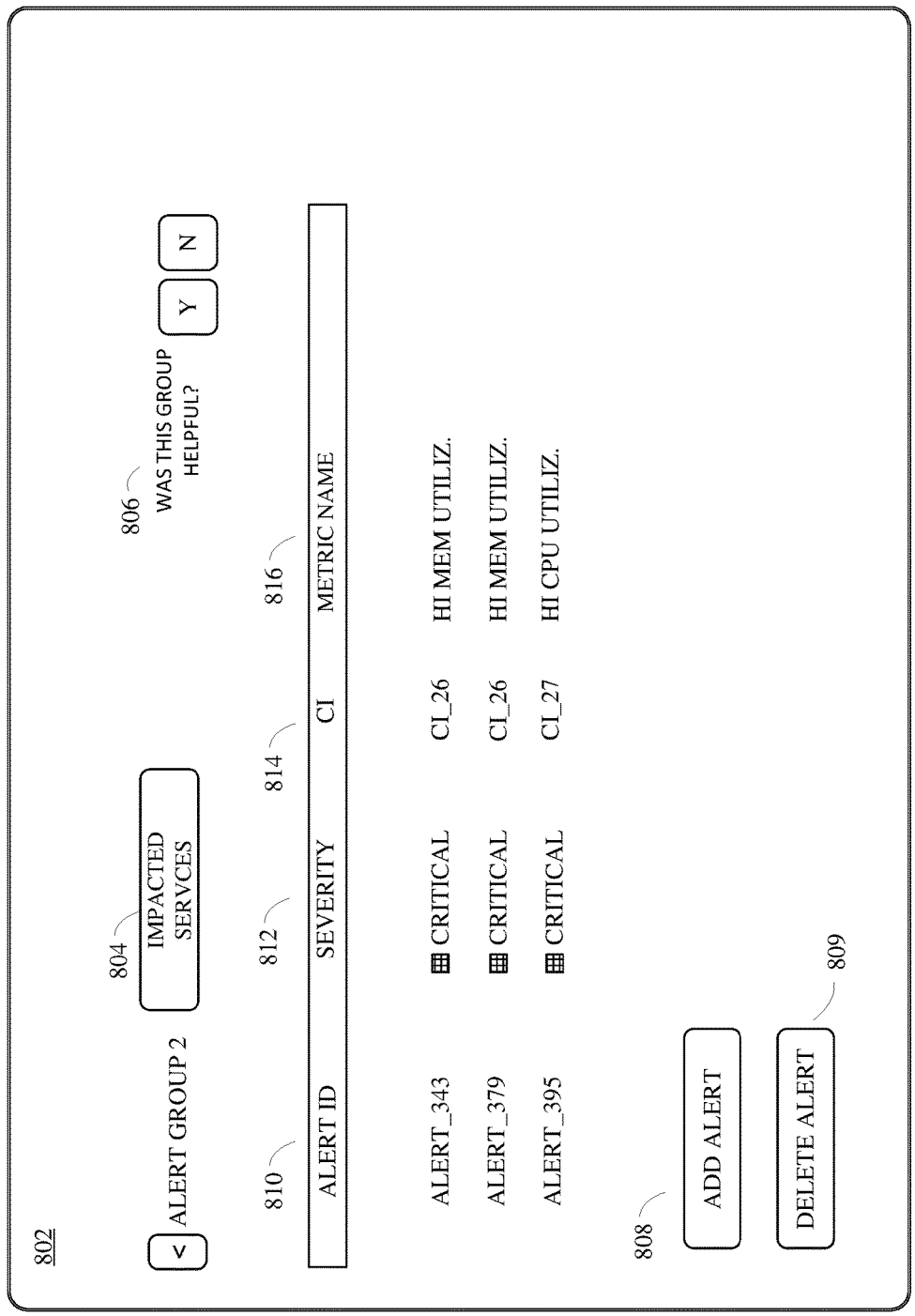
FIG. 8 is a diagram of example display region generated for enabling user feedback and supervision of alert grouping in accordance with the present disclosure.

FIG. 8 is a diagram of an example display region generated for enabling user feedback and supervision of alert grouping in accordance with the present disclosure. In some applications, if the compression rate Comp or alert coverage Acov values do not meet the parameter thresholds, the user or system administrator may delete a group using a graphical user interface, such as the delete alert button 809. The display region 802 may include various alert information for an alert group 803, as shown in FIG. 8. For example, impacted services may be visually accessed by clicking on the impacted services button 804. Feedback 806 from the user may be submitted to a system administrator regarding whether the alert group is representative or related to new alerts. For example, due to irregularities in the pattern detection, some alert groups may be determined to be invalid, in which case the user has the ability to delete the alert group using interface button 809. The display region 802 may also include the alert ID 810, severity of each alert 812, the CI_ID 814, the metric name 816, or a combination thereof, for the alerts in the displayed alert group. In some applications, if an erroneous group repeatedly appears, the user or system administrator may set a rule to prevent particular patterns from being developed by the avalanche pattern detection module 304 or the conditional probability pattern detection module 314. In some applications, the user or system administrator may define patterns and can set a high priority of those patterns if so desired. For instance, a particular alert or entity may be flagged as significant or critical and an associated pattern may be assigned a high priority.

Figure 9:
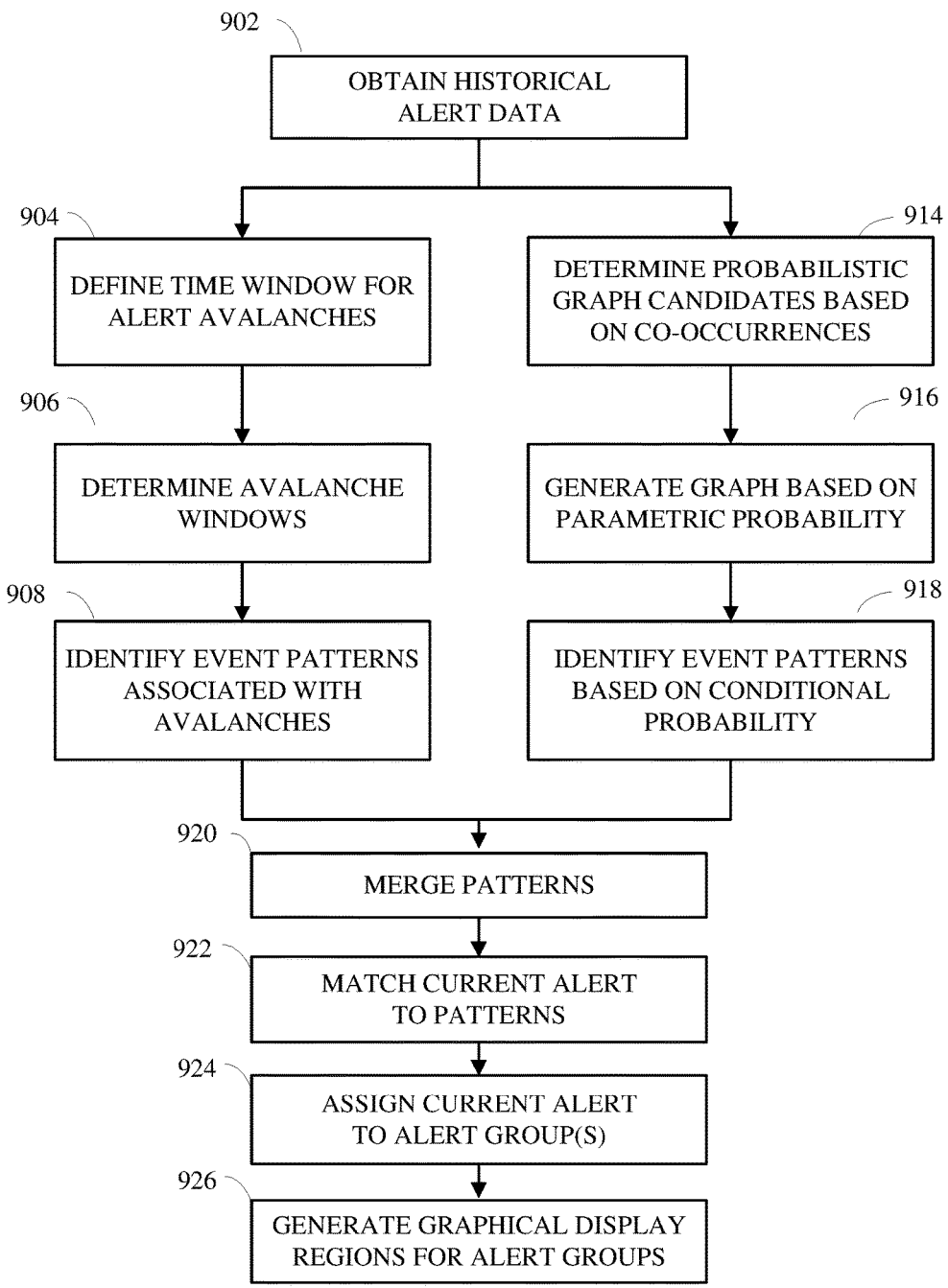
FIG. 9 is a flow chart of an example method of aggregating alerts for management of computer system alerts in accordance with the present disclosure.

FIG. 9 is a flowchart of an example method for aggregating alerts for management of computer system alerts in accordance with this disclosure. Grouping alerts generated by automated monitoring of at least an operating condition change of a machine in a computer network in response to an event, may be implemented in a computing system, such as the cloud computing system 100 shown in FIG. 1. For example, grouping alerts may be implemented on a server, such as one or more of the servers 122 shown in FIG. 1, a computing device, such as a client 112 shown in FIG. 1, or by a combination thereof communicating via a network, such as the network 130 shown in FIG. 1.

Grouping alerts may include obtaining historical alert data at 902, identifying event patterns associated with avalanches at 908, identifying event patterns based on conditional probability at 918, merging patterns at 920, matching alerts to patterns at 922, assigning current alert to alert group(s) at 924, generating graphical display regions for alert groups at 926, or a combination thereof.

In an implementation, event pattern detection module 301 obtains available historical alert data that may be stored in a data storage unit. The historical alert data may include information for each alert, including an alert ID, a time stamp, a configuration item ID, an alert metric, or a combination thereof. The alert data may be associated with alerts received in recent hours, days, weeks or months for computing system 100.

Avalanche patterns may identified at steps 904-908. At 904, time windows may be defined for avalanche detection based on a fixed window size determined by a parameter C1 and inter-arrival time of alerts. Avalanche windows may be determined at 906 based on an avalanche threshold and a parameter C2. At 906, avalanche windows may be determined based on an alert count for a time window meeting or exceeding the avalanche threshold. At 908, event patterns associated with avalanches may be identified based on intersections of avalanche alerts with alerts in each other time window. Avalanche patterns may be based on intersections that have an intersection score that meets or exceeds an avalanche pattern threshold. Intersection scores may be determined based on number of intersections and number of avalanche window alerts.

Conditional probability patterns may be identified at steps 914-918. At 914, probabilistic graph candidates may be determined based on co-occurrences of alert information in the time windows meeting or exceeding a parametric threshold. At 916, a probabilistic graph maybe generated using the probabilistic graph candidates having a probability that satisfies a threshold. Event patterns may be identified based on conditional probability determined from the probabilistic graph, at 918, where conditional probability is based on co-occurrences of CI's for alerts in two or more time windows. The conditional probability may also be supervised by rule based parameters set by a user.

At 920, event patterns identified by avalanche detection may be merged with event patterns identified by conditional probability and stored for alert grouping. At 922, an alert stream is monitored and each alert is compared to the stored patterns. A current alert may be assigned to one or more groups for each match found to a stored pattern at 924.

A graphical display region may be generated for displaying of alert groups at 926 based on the alert groups identified at 924. The graphical display region can include, for example, information relating to the alert groups for monitoring by a user or system administrator, for management of computer system alerts and to enable user feedback and supervision. A graphical display region may be generated in response to a user intervention, such as interface with a graphical user interface. However, in certain circumstances and implementations, the graphical display region may be triggered automatically.

The alert groups displayed in step 926 can include information about associated alerts, including severity type, related alerts and impacted services. Steps 922 through 926 can be repeated multiple times over numerous client instances, server instances, or a combination of both as alerts from an alert stream are received. The alert groups can be ordered in priority order based on severity type.

Steps 902-926 may be performed periodically. For example, a task can be scheduled on an hourly, daily, or weekly basis during which the steps are performed. The steps can be performed on the same or different periodic schedules for each of the database server instances in the cloud infrastructure, such as by physical server or datacenter. Certain database server instances or physical servers may not be included based on user configuration. Upon each iteration, the graphical display regions generated by step 926 can be updated and/or regenerated.

Some or all of the steps of FIG. 9 can be implemented in a pattern detection module and alert grouping module. In one implementation, the pattern detection module and alert grouping module can take the form of one or more Java classes with executable or human-readable code for performing some or all of the steps 902-924 described above. The pattern detection module and alert grouping module can, for example, be located on one or more servers used to manage other servers (management servers) in the cloud computing system, including but not limited to servers 122. The management servers can, for example, include the same or similar platform application and included on some of servers 122. In one implementation, the one or more Java classes can be plugged into or connected to an instance or installation of the platform application to extend the platform functionality to include the functionality of the pattern detection module and alert grouping module. In an implementation, functionality of the pattern detection module and alert grouping module may be accessed via the platform, for example, by using script calls stored in an associated database that are configured to invoke the desired functionality. In one example, the platform can be configured to periodically execute techniques similar to steps 902-924 included in the pattern detection module and alert grouping module without user intervention. In another example, the graphical display regions generated by the presentation module 324 can include one or more links or buttons that when clicked cause the platform to execute other platform functionality for invoking a move operation for an associated database server instance.

Input parameters 312 used in any of the above embodiments may be based on various types of information, included but not limited to value-based information, event-based information, environment-based information, or a combination thereof. For example, value-based information may include business models, service catalog information, customer impact feeds information, or the like. As another example, events-based information may include change management information, alerts, incidents, or the like. As another example, environment-based information may include configuration management database (CMDB) information, business rules, workflows, or the like. All or a portion of implementations of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional implementations may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any implementation or design described herein as "example" is not necessarily to be construed as preferred or advantageous over other implementations or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional implementations of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including" or "having" and variations thereof herein is meant to encompass the items listed thereafter and equivalents thereof as well as additional items. Unless specified or limited otherwise, the terms "mounted," "connected," 'supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for grouping alerts generated by automated monitoring of at least an operating condition change of a machine in a computer network in response to an event, the machine represented as a configuration item in a configuration management database, comprising:
   an avalanche pattern detection module configured to:
      receive historical alert data; and
      identify a first event pattern of alert information based on at least one avalanche of alerts identified from the historical alert data, wherein the first event pattern of alert information is stored in a memory, and wherein the at least one avalanche of alerts is identified based at least in part on an alert count of the historical alert data within a pre-defined time window meeting a threshold;
   a conditional probability pattern detection module configured to:
      receive the historical alert data and a conditional probability threshold used to identify when occurrences of alerts are interrelated; and
      identify, independent of known dependency relationships between configuration items associated with the computer network, a second event pattern of alert information based on a pairwise probability associated with configuration item pairs in the historical alert data and based on the conditional probability threshold, wherein the second event pattern of alert information is stored in the memory, wherein a respective configuration item pair of the configuration item pairs comprises two or more configuration items that generated alerts which co-occur in the pre-defined time window of the historical alert data, wherein a respective configuration item of the two or more configuration items represents a respective machine associated with the historical alert data, and wherein the pairwise probability is determined based at least in part on a ratio between a total number of occurrences of a respective configuration item pair with respect to a total number of occurrences of a given configuration item of the respective configuration item pair;
   an alert grouping module configured to determine at least one alert group by matching at least one configuration item associated with a current alert to a plurality of configuration items of the first event pattern of alert information and to a plurality of configuration items of the second event pattern of alert information stored in the memory; and
   a presentation module configured to:
      generate a graphical display region for presenting the at least one alert group; and
      prioritize in a list rendered on a graphical user interface the at least one alert group with respect to an additional alert group based at least in part on respective severities of alerts associated with the at least one alert group and the additional alert group.

2. The apparatus of claim 1, wherein the avalanche pattern detection module determines the pre-defined time window by determining a plurality of fixed time windows by dividing a duration of the historical alert data into fixed intervals equal to a fixed time window size, the fixed time window size being based on a median of inter-arrival times of consecutive historical alerts, and wherein the at least one avalanche of alerts is identified based on an alert count within a first time window.

3. The apparatus of claim 2, wherein the avalanche pattern detection module determines the fixed time window size by calculating a product of the median of the inter-arrival time of consecutive historical alerts and a factor value, wherein the factor value is a received avalanche parameter.

4. The apparatus of claim 2, wherein the avalanche pattern detection module identifies the at least one avalanche of alerts for a time window on a condition that a number of alerts in the fixed time window exceeds an avalanche threshold, wherein the avalanche threshold is based on a received avalanche parameter and a median of alert count per time window.

5. The apparatus of claim 2, wherein the avalanche pattern detection module identifies the first event pattern of alert information on intersections of configuration items detected by comparison of alert information from the at least one avalanche of alerts to alert information from alerts within a second time window.

6. The apparatus of claim 5, wherein the intersections of configuration items is based on comparing configuration item identifiers of the alert information from the at least one avalanche of alerts and the alert information from the alerts within the second time window.

7. The apparatus of claim 6, wherein the avalanche pattern detection module merges the at least one avalanche of alerts with alerts of adjacent fixed time windows to form a merged avalanche of alerts.

8. The apparatus of claim 5, wherein the intersections of configuration items is based on comparing configuration item identifiers and alert metric pairs of the alert information from the at least one avalanche of alerts and the alert information from the alerts within the second time window.

9. The apparatus of claim 7, wherein the avalanche pattern detection module assigns a score to each alert intersection according to a total number of alert intersections and an avalanche size based on the merged avalanche of alerts.

10. The apparatus of claim 9, wherein the avalanche pattern detection module identifies the first event pattern of event information based on comparing each alert intersection sequentially in descending order of intersection score, to a group overlap percent threshold parameter.

11. The apparatus of claim 1, wherein
the conditional probability pattern detection module divides the historical alert data into a set of fixed size time windows of a same window size; and
the conditional probability pattern detection module filters out pairs of configuration items having a probability less than the conditional probability threshold, wherein the conditional probability threshold is based on an edge count parameter.

12. The apparatus of claim 11, wherein the conditional probability pattern detection module forms a graph of nodes representing configuration item and alert metric pairs associated with the alerts and edges representing relationship between nodes of the graph of nodes, and removes edges of the graph of nodes having a probability below the conditional probability threshold.

13. The apparatus of claim 1, further comprising a pattern merging module that merges the first event pattern of alert information and the second event pattern of alert information.

14. An apparatus for grouping alerts generated by automated monitoring of at least an operating condition change of a machine in a computer network in response to an event, the machine represented as a configuration item in a configuration management database, the apparatus comprising:
a processor configured to execute instructions stored in a memory, the instructions comprising instructions to cause the processor to:
identify independent of known dependency relationships between configuration items associated with the computer network, via a pattern detection module, an event pattern from historical alert data associated with a plurality of configuration items, wherein the event pattern is based on an intersection of a first subset of the plurality of configuration items identified in an avalanche of alerts with a second subset of the plurality of configuration items identified in the historical alert data, wherein the second subset is based on a pairwise probability associated with pairs of configuration item in a pre-defined time window of the historical alert data and based on a conditional probability threshold, wherein a respective configuration item pair of the configuration item pairs comprises two or more configuration items, wherein a respective configuration item of the plurality of configuration items represents a respective machine associated with the historical alert data, wherein the pattern detection module identifies the avalanche of alerts based on at least one avalanche parameter, and wherein the pairwise probability is determined based at least in part on a ratio between a total number of occurrences of a respective configuration item pair with respect to a total number of occurrences of a given configuration item of the respective configuration item pair; and
store the event pattern in the memory;
assign, via an alert grouping module, a current alert to at least one alert group by matching at least one configuration item associated with the current alert to the plurality of configuration items associated with the event pattern stored in the memory;
generate, via a presentation module, a graphical display region configured to present the at least one alert group; and
prioritize in a list rendered on a graphical user interface the at least one alert group with respect to an additional alert group based at least in part on respective severities of alerts associated with the at least on alert group and the additional alert group.

15. The apparatus of claim 14, wherein the pattern detection module determines the pre-defined time window by determining a plurality of fixed time windows by dividing a duration of the historical alert data into fixed intervals equal to a fixed time window size, the fixed time window size being based on a median of inter-arrival times of consecutive historical alerts, and wherein the avalanche of alerts is identified based on an alert count within a first time window.

16. The apparatus of claim 15, wherein the pattern detection module identifies the event pattern based on the first subset of the plurality of configuration items identified by comparing alert information from the avalanche of alerts to alert information from alerts within a second time window.

17. The apparatus of claim 14, wherein the pattern detection module identifies the avalanche of alerts through assigning a score to an additional intersection of a total number of alert intersections and of a total number of alerts in the avalanche of alerts.

18. The apparatus of claim 17, wherein the pattern detection module identifies the event pattern based on if the score of the additional intersection is greater than an avalanche pattern threshold parameter.

19. An article of manufacture comprising one or more tangible, non-transitory, machine readable media comprising instructions to:
receive historical alert data;
identify a first event pattern of alert information based on at least one avalanche of alerts identified from the historical alert data, wherein the at least one avalanche of alerts is identified based at least in part on an alert count of the historical alert data within a pre-defined time window meeting a threshold;
receive a conditional probability threshold;
identify, independent of known dependency relationships between configuration items associated with a computer network, a second event pattern of alert information based on a pairwise probability associated with configuration item pairs in the historical alert data and based on the conditional probability threshold, wherein a respective configuration item pair of the configuration item pairs comprises two or more configuration items that generated alerts which co-occur in the pre-defined time window of the historical alert data, wherein a respective configuration item of the two or more configuration items represents a respective machine associated with the historical alert data, and wherein the pairwise probability is determined based at least in part on a ratio between a total number of occurrences of a respective configuration item pair with respect to a total number of occurrences of a given configuration item of the respective configuration item pair;
determine at least one alert group by matching at least one configuration item associated with a current alert to a plurality of configuration items of the first event pattern of alert information and to a plurality of configuration items of the second event pattern of alert information;
generate a graphical display region for presenting the at least one alert group; and
prioritize in a list rendered on a graphical user interface the at least one alert group with respect to an additional alert group based at least in part on respective severities of alerts associated with the at least on alert group and the additional alert group.

20. The article of manufacture of claim 19 comprising instructions to:
divide the historical alert data into a set of fixed size time windows of a same window size; and
filter out pairs of configuration items having a probability less than the conditional probability threshold, wherein the conditional probability threshold is based on an edge count parameter.

21. The apparatus of claim 1, wherein the conditional probability pattern detection module is configured to validate the second event pattern of information by using the known dependency relationships between the configuration items associated with the computer network.

* * * * *